United States Patent Office 3,281,459
Patented Oct. 25, 1966

3,281,459
PREPARATION OF AROMATIC POLYCARBOXYLIC ACIDS FROM 2,2-DITOLYL-ALKANES
Carl Serres, Jr., Whiting, Ind., and Ellis K. Fields, Chicago, Ill., assignors to Standard Oil Company, Chicago, Ill., a corporation of Indiana
No Drawing. Original application Aug. 6, 1962, Ser. No. 214,806, now Patent No. 3,161,693, dated Dec. 15, 1964. Divided and this application May 6, 1964, Ser. No. 368,443
6 Claims. (Cl. 260—524)

This is a division of application Serial No. 214,806, filed August 6, 1962, now U.S. Patent 3,161,693.

This invention relates to the preparation of aromatic carboxylic acids. More particularly, it relates to a method for the simultaneous preparation of benzene polycarboxylic acids and carboxy-substituted diarylalkanes, and to the preparation of feedstocks for use in the preparation of such acids.

It has been discovered in accordance with the present invention that liquid phase oxidation with molecular oxygen in the presence of catalytic amounts of a catalyst consisting essentially of ions of bromine and heavy metals is particularly effective for the simultaneous conversion of substituted diarylalkanes, hereinafter described, having oxidizable alkyl substituents to aromatic and aralkane carboxylic acids.

It is known in the prior art that benzophenone polycarboxylic acids can be prepared by the oxidation of alkyl-substituted diarylmethanes. It is likewise known that aromatic carboxylic acids can be prepared by catalytic oxidation of alkyl-substituted aryl compounds by means of molecular oxygen in the presence of bromine and heavy metal ions. The discovery associated with this invention resulted from attempts to oxidize the class of diarylalkanes containing oxidizable alkyl substituents described hereinatfer in accordance with prior art procedures, and did not produce the usually expected products of benzophenone polycarboxylic acids or aromatic carboxylic acids. Rather, it was found that some cleavage of the alkane chain occurred at the carbon atom containing the diaryl substituents to produce aromatic polycarboxylic acids simultaneously with the production of carboxy-substituted diarylalkanes.

This discovery can be illustrated by the following equation, wherein a diarylalkane having the Formula A is oxidized with molecular oxygen in an oxidation zone, while maintaining a liquid phase in said zone, in the presence of a catalyst consisting essentially of ions of bromine and heavy metals to give a benzene polycarboxylic acid of the Formula B and a dicarboxy-substituted phenyl alkane of Formula C:

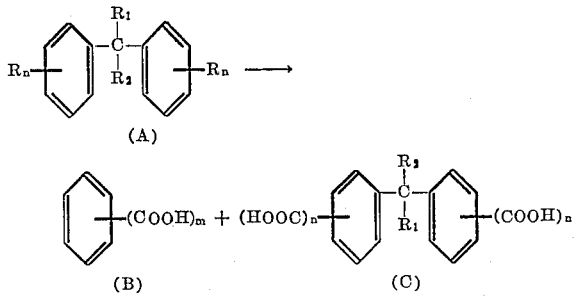

Representative of the above illustrative reaction is the simultaneous production of terephthalic acid and 2,2-di(para-carboxyphenyl)butane from the liquid phase oxidation in accordance with this invention of 2,2-ditolylbutane.

In Formula A above, which represents the diarylalkane reactant of this invention, R is a $C_{1-3}$ alkyl radical, $R_1$ is an alkyl radical, $R_2$ is an alkyl radical having at least 2 carbon atoms and $n$ is 1 to 3. The methyl, ethyl and propyl radicals represented by R are nuclear substituents on the phenyl radical and are easily oxidizable to carboxyl radicals. The diarylalkane can be any straight or branched-chain alkane containing a minimum of 4 carbon atoms, preferably 4 to 22 carbon atoms, in the chain represented by

in Formula A, with the proviso that the diaryl substituents be on the same non-terminal carbon atom in the alkane chain. Illustrative alkanes are 2,2-di-(para-tolyl)-butane, 2,2-di-(3,4-dimethylphenyl)-butane, 2,2-di-(2,4,5-trimethylphenyl)-butane, 3,3-di-(para-tolyl)-pentane, 2,2-di-(para-tolyl)-hexane, 3,3-di - (3,4 - dimethylphenyl)-octane, 4,4-di-(3,4-diethylphenyl)-nonane, 9(10), 9(10)-di-(4-isopropylphenyl)-octadecane, etc. These diarylalkanes can be prepared in conventional manner known to the art.

In Formula B above, $m$ is 2 to 4. In the above Formula C, $R_1$, $R_2$ and $n$ have the same meaning as hereinbefore set forth with respect to $R_1$, $R_2$ and $n$ in Formula A.

The liquid phase oxidation of the diarylalkanes containing oxidable alkyl substituents wherein some cleavage of the alkane occurs is an entirely unexpected reaction. The benzene carboxylic acids produced were found to contain one more carboxyl group than the number of alkyl substituents present on the phenyl radical substituent of the diarylalkane. In other words, when cleavage of the diarylalkane occured, there was produced approximately two moles of polycarboxylic acid per mole of disappearance of the diarylalkane. The exact mechanism which occurs during the liquid phase oxidation of this invention is unknown; however, isomerization of the diarylalkane must occur prior to cleavage of the alkane chain since monocarboxylic acids were not recovered from the oxidation reaction mixture. For example, in the oxidation of 2,2-di-(para-tolyl)-butane, the corresponding - 2,2 - di - (para-carboxyphenyl)-butane and terephthalic acid were recovered from the oxidation reaction mixture in the reaction products; but no benzoic acid was found in the mixture.

In the practice of the invention, the oxidation of the diaryl-alkanes whereby a benzene carboxylic acid and a di - (para-carboxy - substituted - phenyl)alkane is simultaneously obtained, is effected by reacting the diarylalkane with molecular oxygen, e.g. air, in the presence of a catalyst consisting essentially of ions of bromine and heavy metals. As the heavy metal oxidation catalyst there can be employed catalysts that have hereto before been employed for accelerating the oxidation of organic compounds, such as the solid polyvalent metals having atomic weights between about 50 and 200. Of the heavy metal group, those metals having an atomic number not greater than 84 have been found most suitable. Excellent results are obtained by utilization of a metal having an atomic number 23–28, including vanadium, chromium, manganese, iron, cobalt and nickel. Particularly excellent results are obtained with a metal of the group consisting of manganese, cobalt and mixtures thereof.

It has been found that the catalytic amount of the metal can be either as a single metal or as a combination of such metals. The metal can be added in elemental, combined or ionic form and the bromine can similarly be added in elemental, combined or ionic form. As a source of bromine, ammonium bromide or other bromine compounds soluble in the reaction medium can be employed. Satisfactory results have been obtained for example, with potassium bromide, tetrabromoethane and benzyl bromide.

The metal can be supplied in the form of the free metal, as the oxide or hydroxide, or in the form of metal salts. For example, the metal manganese can be supplied as the manganese salt of a lower aliphatic carboxylic acid, such as manganese acetate, as the salt of a fatty acid, such as manganese oleate or linoleate, as the metal salt of an aromatic or alicyclic acid, such as manganese naphthenate, or in the form of an organic complex, of which mention may be made of the acetylacetonate, the 8-hydroxyquinolinate and the ethylene diamine tetra-acetate, etc., as well as manganese salts such as the borates, halides, nitrates and the like which are also efficacious.

The reaction temperature should be sufficiently high so that the desired oxidation reaction occurs, and yet not so high as to cause undesirable charring or formation of tars. Thus temperatures in the range of from about 120° to about 275° C., desirably 150° to 250° C. and preferably 170° to 225° C. can be employed. The reaction time should be sufficient to obtain a desirable conversion of the substituted aromatic material to the desired monocarboxylic acid, e.g. in the range of about 0.5 to about 25 or more hours, preferably up to about 4 hours.

The oxygen used can be in the form of substantially 100% oxygen gas or in the form of gaseous mixtures containing lower concentrations of oxygen, such as, for example, air. The ratio of total oxygen fed into the reaction mixture relative to the aromatic compound oxidized is in the range of about 2 to 500 moles of oxygen per mole of substituted aromatic material, desirably in the range of 5 to 300 and preferably in the range of 5 to 75.

The process of the present invention is conducted under essentially liquid phase conditions, desirably in the presence of an oxidation resistant reaction medium in which the organic reactant is soluble or suspended. The relation of temperature and pressure is so regulated as to provide a liquid phase in the reaction zone. Generally the pressure can be in the range of atmospheric to about 1500 p.s.i.g., the pressure being sufficient at the operating temperature to maintain all or a part of the organic reactant in the liquid phase.

As inert reaction media there can be employed materials substantially inert to oxidation which facilitate carrying out the desired reaction and recovering the desired product or products. Desirably this added medium is a mono-carboxylic acid relatively stable or inert to oxidation in the reaction system, preferably containing about 2 to 8 carbon atoms in the molecule, for example saturated aliphatic mono-carboxylic acids, aromatic acids such as benzoic acid, alicyclic acids such as cyclohexane carboxylic acid and the like. Saturated aliphatic mono-carboxylic acids containing 2 to 4 carbon atoms are particularly preferred. Mixtures of acids can be used, for example mixtures of said lower carboxylic acids, or mixtures of such acids with benzoic acid. Where all of the advantages of an acid medium are not required, other inert media can be used of which mention can be made of benzene, carbon tetrachloride, chlorinated hydrocarbons such as chlorinated benzenes or chlorinated naphthalenes, and the like.

Where the lower aliphatic monocarboxylic acid medium is used, it is generally not necessary to use large amounts thereof. Such acids in the range of 0.1 to 10 parts by weight, desirably 0.5 to 4 and preferably 1 to 2.5 per part of aromatic material have been found adequate.

The catalyst, illustratively, can be a heavy metal bromide, for example, manganese bromide, and can be added as such or by means of materials which provide a catalytic amount of heavy metal and of bromine in the reaction system. The heavy metal oxidation catalyst can be added in the form of the metal, oxide, acetate or analogous carboxylate salts or as a heavy metal halide; and the bromine may, as above indicated, be added in the form of elemental bromine, ammonium bromide, hydrogen bromide or other bromine compound soluble or partially soluble in the system, e.g. potassium bromate. If desired, the bromine can be in the form of a soluble organic bromide, viz. tetrabromoethane, benzyl bromide and the like. The amount of catalyst, for example of manganese and bromine, calculated as $MnBr_2$ can be in the range of about 0.1 to 10% by weight or more of the aromatic reactant charged, desirably 0.3 to 2 and preferably 0.5 to 1.7 percent. Mixtures of materials can be used, and the proportions of heavy metal oxidation catalyst and bromine can be varied from their stoichiometric proportions encountered in heavy metal bromides such as $MnBr_2$, for example in the range of about 1 to 10 atoms of heavy metal per atom of bromine to about 1 to 10 atoms of bromine per atom of heavy metal.

An illustrative embodiment of the invention is:

*Example 1*

A mixture of 60 g. of 2,2-di-p-tolylbutane, 143 ml. glacial acetic acid, and a solution of 0.8 g. cobalt acetate tetrahydrate, 1.6 g. manganese acetate tetrahydrate, and 0.8 g. ammonium bromide in 6 ml. water was heated in a corrosion resistant pressure oxidation reactor equipped with a stirrer and heating means and provided with a water cooled condenser, gas inlet means and valved gas outlet for adjusting the exit flow of gas at 400° F. while air at 400 p.s.i.g. was passed through the mixture at the rate of 0.13 cubic foot per minute. The oxygen in the off-gases dropped to 6.3% over 2.7 cubic feet and then rose at 10.5 cubic feet to 20.8%. The reactor was allowed to cool and the contents removed. Evaporation of the acetic acid left a residue of crude light tan acid. This acid was dissolved in dilute sodium hydroxide solution, filtered to remove insolubles, the acid was sprung with concentrated hydrochloric acid, filtered, water-washed and dried. The neutral equivalent (119.5) and infrared analysis indicated the product was a 1:1 mixture of terephthalic acid and 2,2-di-(p-carboxyphenyl)-butane. The two acids are easily separated by crystallization with ethanol-water solutions. The 2,2-di-(p-carboxyphenyl)-butane is very soluble in ethanol and was obtained from this solvent as white crystals, N.E. 149 (calculated 149) and M.P. 263–264° C.; the crude insoluble residue of terephthalic acid had N.E. 85 (calculated 83).

*Example 2*

Example 1 was repeated except no bromine was used. The reaction mixture contained 420 g. (1.765 moles) of the 2,2-ditolylbutane, 2.8 g. cobalt acetate tetrahydrate and 5.6 g. manganese acetate tetrahydrate in 2100 ml. of glacial acetic acid. Product work-up as described in Example 1 gave only 47 g. (0.28 mole) of terephthalic acid and 468 g. (1.57 moles, 90 mole percent) of the 2,2-di-(p-carboxyphenyl)-butane.

Thus, bromine ions are essential for effecting the simultaneous preparation of the described polycarboxylic acids.

The process of the present invention can be conducted on a continuous, intermittent or batch basis. Water can be removed to maintain any desired concentration thereof, e.g., by distillation, by adding acetic anhydride or the like.

Desirable or comparable results can be achieved with various modifications of the process described and exemplified above. Thus, the pressure can be varied in the range of atmospheric up to about 1500 p.s.i.g., the pressure being sufficient to maintain all or a part of the organic reactant in the liquid phase. It will be recognized that time, temperature, catalyst concentration and the like are interrelated variables and can be varied depending upon the particular feedstock employed. Lower temperatures can, for example, be indicated where a more highly concentrated source of molecular oxygen is employed in lieu of air, for example, pure oxygen or mixtures of oxygen and inert gas containing 50% or more by volume of molecular oxygen.

Thus, the present invention provides a novel procedure for the simultaneous preparation of highly desirable benzene polycarboxylic acids and di-(carboxy-substituted phenyl)alkanes. For example, the liquid phase oxidation of the specified diarylalkane feedstocks, such as 2,2-ditolyl butane, further provides an alternative route for the preparation of the most desirable position specific phthalic acid isomer, namely, terephthalic acid from readily available raw materials with the concomitant production of the valuable dicarboxy-substituted diarylalkanes. The readily available, low-cost raw materials, such as acetylene, toluene and ethylene, can be reacted in known manner for the preparation of the 2,2-ditolyl butane feedstock. For example, the reaction of acetylene and toluene yields ditolyl ethane, which upon further reaction with ethylene yields a highly desirable feedstock, namely, 2,2-ditolyl butane. Consequently, this alternative oxidative procedure avoids the problems associated with the use of the para-xylenes as feedstocks for the production of phthalic acids, which problems are the separation of the para-xylenes from ortho-xylene mixtures or the separation of terephthalic acid from isomeric phthalic acid mixtures.

Another aspect of the invention resides in the provision of an improved method for the preparation of diarylalkane compounds generally, certain members of which can be used as feedstocks for the simultaneous preparation of benzene polycarboxylic acids and carboxy-substituted diarylalkanes in accordance with this invention. The improved method of preparing diarylalkanes of the formula

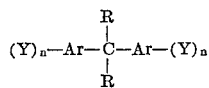

wherein R is an alkyl radical, Ar is an aromatic radical, Y is a substituent on the aromatic nucleus of the group consisting of alkyl, chlorine and bromine, and $n$ is 0 to 4, comprises the steps of reacting (A) an arene having 0 to 5 substituents of the group consisting of alkyl, chlorine and bromine attached to the aromatic nucleus with (B) an aralkane having the formula

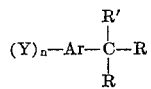

wherein Ar is an aromatic radical, Y is a substituent on the aromatic nucleus of the group consisting of alkyl, chlorine and bromine, $n$ is 0 to 4, and R and R' each represent an alkyl radical, in the presence of a strong Lewis acid and a substituted diaryl methane having the formula

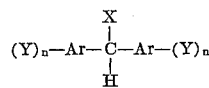

wherein Ar is an aromatic radical, Y is a substituent on the aromatic nucleus of the group consisting of alkyl, chlorine and bromine, $n$ is 0 to 4, and X represents Cl, Br and OH; said reaction being performed in liquid phase at a temperature of from about $-10°$ C. to about $140°$ C., for a period of time sufficient to form said diaryl alkane.

This improved procedure for the synthesis of diarylalkanes of the above formula, hereinafter referred to as n,n-diarylalkanes, is a hydride transfer reaction involving n-arylalkanes containing at least three carbon atoms in the alkane chain, arenes having at least one unsubstituted carbon in the aromatic nucleus and a hydride ion acceptor which is a substituted diarylmethane. This reaction is catalyzed by a strong Lewis acid such as aluminum chloride, aluminum bromide, hydrogen sulfide, oleums, antimony pentachloride, boron trifluoride, boron trichloride and halo-sulfonic acids, as well as mixtures of these materials. Of these strong Lewis acids, aluminum chloride and aluminum bromide are preferred. The amount of Lewis acid can range from about 1 to about 110 mole percent of the substituted diarylmethane, which acts as the hydride ion acceptor. When the hydrogen acceptor is in the form of an alcohol, such as benzhydrol, an equimolar amount of Lewis acid is required. If the hydrogen ion acceptor is a halide, such as benzhydryl chloride, the amount of Lewis acid may range from 1 to 20 mole percent.

The arene reactant is illustrated by benzene, toluene, chlorobenzene, bromobenzene, xylene, ethylbenzene, naphthalene, phenanthrene, anthracene, biphenyl and the like. The alkyl substituents can be of any chain length, but preferably from 1 to 22.

The n-arylalkanes containing at least three carbon atoms in the alkane chain are illustrated by cumene, cymene, 2-phenylbutane, 2-tolylbutane, 3-phenylpentane, 3-tolylpentane, isopropyl naphthalene, isopropyl biphenyl, isopropyl anthracene, isopropyl phenanthrene, retene, etc. In other words, any monoaryl-substituted alkane wherein the carbon atom to which the aryl radical is attached is a non-terminal carbon atom and such alkane contains a benzylic hydrogen on the carbon atom containing the aryl substituents can be used. Such n-aryl-substituted alkanes are prepared in known manner from alkene and arene reactants. The n-arylalkanes, preferably contain 3 to 22 carbon atoms, can be branched or straight-chain compounds.

The preferred substituted diarylmethanes used as the hydrogen ion acceptors are benzhydryl chloride and benzhydryl bromide.

The reaction temperature used in the above described reaction is in the range of from about $-10°$ C. to about $140°$ C., and preferably from about 15 to about $30°$ C.

The arene is preferentially used as both a reactant and as the reaction medium for the hydride transfer reaction. Consequently, it is used in excess of the other reactants. The aralkane reactant and hydride ion acceptor are normally used in equimolar proportions.

The time of the reaction is in the range of from about 0.5 to 24 hours, preferably 1 to 2 hours. The time is not critical inasmuch as the reaction is very rapid and the rate of reaction is dependent upon the rate of addition of the diarylmethane compound which acts as the hydrogen ion acceptor. Normally, the hydrogen ion acceptor is added to the reaction mixture containing the arene, the n-aryl alkane and strong Lewis acid.

The preparation of n,n'-diarylalkanes is illustrated in the following examples:

*Example 3*

A hydride transfer reaction involving benzene and cumene was run by adding 46 g. (0.5 mole) of t-butyl chloride dropwise over 0.5 hour at 22° C. to a rapidly stirred mixture of 195 g. (2.5 moles) benzene, 60.0 g. (0.5 mole) cumene, and 6.5 g. (0.05 mole) of anhydrous aluminum chloride. The mixture was stirred another hour after addition of t-butyl chloride was completed and hydrolyzed with water. The hydrocarbon mixture was water-washed, dried over sodium sulfate, then fractionated through a 10 plate Oldershaw column. Fraction one was taken from 75 to 230° C. at 1.0 atm. (wt. 91.5 g.) and fraction two was the remaining undistilled pot residue (wt. 12.5 g.). Both fractions were analyzed directly by gas chromatography.

Fraction one contained seven components; only three of the most interest (comprising 94% of the fraction) were identified. These components and their concentration as calculated from the gas chromatogram were: unreacted cumene 37.0 g. (0.31 mole), t-butylbenzene 40.0 g. (0.3 mole), and t-butylcumene 9.0 g. (0.05 mole). The other components were not separated and identified.

Fraction two was 86% of the desired 2,2-diphenylpropane. The remaining 14% was composed of four higher boiling unidentified components. The yield of 2,2-diphenylpropane was 10.5 g. (0.535 mole, 10.7 mole percent). The identity of this product was established by comparison of physical properties, and infrared and mass spectra with authentic 2,2-diphenylpropane.

*Example 4*

The preparation described in Example 3 was repeated, except the reaction was conducted at 55° C. giving 0.03 mole (7.8 mole percent) of 2,2-diphenylpropane and tert-butyl benzene (0.16 mole) as the principal reaction products.

*Example 5*

The reaction described in Example 3 was repeated using 0.5 mole benzhydryl chloride as the hydrogen ion acceptor. Products obtained were 2,2-diphenylpropane (0.17 mole, 21.4 mole percent), diphenylmethane (0.415 mole) and triphenylmethane (0.218 mole).

*Example 6*

The reaction of Example 5 was repeated, except it was conducted at 55° C., giving 0.0873 mole of 2,2-diphenylpropane (17.4 mole percent) and 0.18 mole diphenylmethane.

*Example 7*

Reaction of 230 g. (2.5 moles) toluene, 67.0 g. (0.5 mole) p-cymene, 46 g. (0.5 mole) t-butyl chloride and 0.05 mole of aluminum chloride at 20° C. gave six simple alkyl-arene components boiling at 107–240° C., atmospheric pressure. Among these components were 49.5 g. (0.37 mole) of cymene isomers and 55.5 g. (0.375 mole) of t-butyltoluene isomers. The next highest boiling product came over at 300° C. and was the first of the desired products of hydride transfer. The following high boiling hydride transfer products were found by gas chromatography (250° C., Apiezon L. columns).

| Component | Estimated B.P. at 1 Atm., ° C. | Percent | Calc'd Wt., g. |
|---|---|---|---|
| m,m'-Ditolylpropane | 300 | 21 | 2.4 |
| m,p'-Ditolylpropane | 310 | 27 | 3.1 |
| p,p'-Ditolylpropane | 320 | 26 | 3.0 |
| Unknown (4 components) | 325–350 | 26 | 3.0 |

Fractional distillation through a 100 plate spinning band column gave only gradual enrichment of the components but not complete separation. Pure components were obtained directly from the gas chromatograph by trap-out procedures. The total yield of the three ditolylpropane isomers was 8.5 g. (0.038 mole, 7.6 mole percent).

The p,p'-ditolylpropane was identified by comparison of its physical properties and infrared and mass spectra with authentic p,p'-ditolylpropane.

*Example 8*

The reaction of Example 7 was repeated, except that 0.5 mole benzhydryl chloride was used instead of the tert-butyl chloride. The principal reaction products were 2,2-ditolylpropane (0.065 mole) 13 mole percent, 0.2 mole diphenylmethane and 0.2 mole triphenylmethane.

While the improved synthesis of n,n'-diarylalkanes has been exemplified by the preparation of 2,2-diphenyl- and 2,2-ditolylpropanes, the corresponding diarylalkanes having four or more carbon atoms in the alkane chain, which are useful as feedstocks for the simultaneous preparation of benzene polycarboxylic acids and n,n-(dicarboxyaryl)alkanes, can be similarly prepared.

The use of the substituted diarylmethanes herein described as hydrogen ion acceptors, exemplified by benzhydryl chloride, substantially improves the yield of the desired n,n-diarylalkanes over the use of tertiary-alkyl halides, exemplified by tertiary-butyl chloride herein, as the hydrogen ion acceptor. The use of tertiary-alkyl halides as hydrogen ion acceptors is disclosed in U.S. 2,742,512, which relates to the preparation of diarylalkanes. This patent also discloses that secondary alkyl halides can be used as hydrogen acceptors provided there is rearrangement under the conditions of the reaction to a corresponding tertiary halide. The patentee also states that the temperature of the reaction must be maintained within the range of from 50 to 110° C. It has been found that contrary to the teachings of this patent, the use of the secondary diarylalkyl halides and the corresponding alcohols are more advantageous hydride ion acceptors. The principal advantages obtained through the use of the secondary alcohols and halides are increased yields and the production of diarylmethanes which can be easily converted to the corresponding diaryl secondary halides for reuse in the reaction; whereas the tertiary-alkyl halides of the reference are converted to the corresponding hydrocarbons, which are not convertible back to the halide for reuse in the reaction.

Thus having described the invention, what is claimed is:

1. A method for the simultaneous preparation of a benzene polycarboxylic acid of the formula

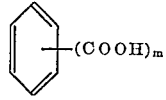

wherein $m$ is 2 to 4, and a di-(carboxy-substituted-phenyl) alkane of the formula

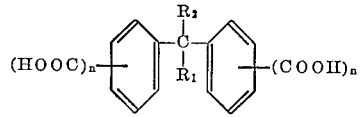

wherein $R_1$ is an alkyl radical, $R_2$ is an alkyl radical having at least 2 carbon atoms and $n$ is 1 to 3, which comprises reacting in an oxidation zone, while maintaining a liquid phase in said zone, a diaryl alkane having the formula

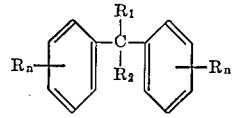

wherein R is a $C_{1-3}$ alkyl radical, $R_1$ is an alkyl radical, $R_2$ is an alkyl radical having at least 2 carbon atoms, and $n$ is 1 to 3, with molecular oxygen in the presence of a catalyst consisting essentially of ions of bromine and heavy metal oxidation catalysts of atomic weight between about 50 and 200; and recovering said carboxylic acids.

2. The method of claim 1 wherein the heavy metal has an atomic number of 23 to 28 inclusive.

3. The method of claim 1 wherein said heavy metal consists of a mixture of manganese and cobalt.

4. The method of claim 1 wherein said reaction is carried out in the presence of a $C_{2-8}$ monocarboxylic acid.

5. The method of claim 4 wherein the monocarboxylic acid is acetic acid, the temperature is in the range of from 120 to 275° C. and the pressure is in the range of 0 to 1500 p.s.i.g.

6. The method for the simultaneous preparation of terephthalic acid and 2,2-di-(para-carboxyphenyl)-butane which comprises reacting in an oxidation zone, while maintaining a liquid phase in said zone, 2,2-ditolylbutane with molecular oxygen in the presence of a catalyst consisting of ions of bromine and heavy metal oxidation catalysts of atomic weight between about 50 and 200, and recovering said polycarboxylic acids.

References Cited by the Examiner
UNITED STATES PATENTS

| | | | |
|---|---|---|---|
| 2,833,816 | 5/1958 | Saffer et al. | 260—523 X |
| 2,851,437 | 9/1958 | Petropoulos | 260—524 X |
| 3,139,452 | 6/1964 | Hay | 260—524 |

LORRAINE A. WEINBERGER, *Primary Examiner.*

L. A. THAXTON, *Assistant Examiner.*